(12) United States Patent
Rathbun

(10) Patent No.: US 8,555,355 B2
(45) Date of Patent: Oct. 8, 2013

(54) MOBILE PIN PAD

(75) Inventor: George Steven Rathbun, Mystic, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 332 days.

(21) Appl. No.: 12/961,886

(22) Filed: Dec. 7, 2010

(65) Prior Publication Data

US 2012/0144461 A1 Jun. 7, 2012

(51) Int. Cl.
*H04L 29/06* (2006.01)
(52) U.S. Cl.
USPC .................................. 726/5; 726/11; 726/29
(58) Field of Classification Search
USPC .................................................. 726/5, 11, 29
See application file for complete search history.

(56) References Cited

U.S. PATENT DOCUMENTS

| | | | | |
|---|---|---|---|---|
| 6,983,381 | B2* | 1/2006 | Jerdonek | 726/5 |
| 7,181,762 | B2* | 2/2007 | Jerdonek | 726/2 |
| 7,679,503 | B2* | 3/2010 | Mason et al. | 340/506 |
| 7,908,645 | B2* | 3/2011 | Varghese et al. | 726/4 |
| 8,225,102 | B1* | 7/2012 | Palmer et al. | 713/183 |
| 8,300,023 | B2* | 10/2012 | Forutanpour et al. | 345/173 |
| 2001/0014881 | A1* | 8/2001 | Drummond et al. | 705/43 |
| 2002/0095507 | A1* | 7/2002 | Jerdonek | 709/229 |
| 2002/0095569 | A1* | 7/2002 | Jerdonek | 713/155 |
| 2002/0109677 | A1* | 8/2002 | Taylor | 345/173 |
| 2002/0160745 | A1* | 10/2002 | Wang | 455/404 |
| 2002/0164031 | A1* | 11/2002 | Piikivi | 380/270 |
| 2002/0194503 | A1* | 12/2002 | Faith et al. | 713/201 |
| 2003/0004876 | A1* | 1/2003 | Jacobson | 705/41 |
| 2003/0182194 | A1* | 9/2003 | Choey et al. | 705/16 |
| 2005/0097320 | A1* | 5/2005 | Golan et al. | 713/166 |
| 2005/0121513 | A1* | 6/2005 | Drummond et al. | 235/381 |
| 2005/0125350 | A1* | 6/2005 | Tidwell et al. | 705/42 |
| 2005/0125360 | A1* | 6/2005 | Tidwell et al. | 705/65 |
| 2005/0131824 | A1* | 6/2005 | Drummond et al. | 705/43 |
| 2005/0149430 | A1* | 7/2005 | Williams | 705/38 |
| 2005/0250538 | A1* | 11/2005 | Narasimhan et al. | 455/558 |
| 2005/0288035 | A1* | 12/2005 | Wang | 455/456.1 |
| 2006/0282660 | A1* | 12/2006 | Varghese et al. | 713/155 |
| 2007/0022058 | A1* | 1/2007 | Labrou et al. | 705/67 |
| 2007/0125838 | A1* | 6/2007 | Law et al. | 235/379 |
| 2007/0125840 | A1* | 6/2007 | Law et al. | 235/379 |
| 2007/0175978 | A1* | 8/2007 | Stambaugh | 235/379 |
| 2007/0265984 | A1* | 11/2007 | Santhana | 705/65 |
| 2008/0086759 | A1* | 4/2008 | Colson | 726/2 |
| 2008/0306877 | A1* | 12/2008 | Mandeles et al. | 705/76 |
| 2009/0063345 | A1* | 3/2009 | Erikson | 705/44 |
| 2009/0063802 | A1* | 3/2009 | Johnson et al. | 711/164 |
| 2009/0068982 | A1* | 3/2009 | Chen et al. | 455/407 |
| 2009/0089869 | A1* | 4/2009 | Varghese | 726/7 |
| 2009/0222891 | A1* | 9/2009 | Heffez | 726/3 |
| 2009/0249076 | A1* | 10/2009 | Reed et al. | 713/181 |
| 2009/0270078 | A1* | 10/2009 | Nam et al. | 455/414.1 |
| 2010/0042847 | A1* | 2/2010 | Jung et al. | 713/183 |

(Continued)

*Primary Examiner* — David García Cervetti

(57) ABSTRACT

A system is configured to: receive an authentication request for a transaction from a web server; identify a phone number of the mobile device based on identifying information of the user in the authentication request and the user information, transmit a message to the mobile device based on the phone number, receive a message response from the mobile device, determine whether the mobile device provided a mobile pin pad authentication for the user based on the message response, and transmit a success authentication response to the web server when the mobile device provided the mobile pin pad authentication for the user.

20 Claims, 7 Drawing Sheets

(56) References Cited

U.S. PATENT DOCUMENTS

| | | | |
|---|---|---|---|
| 2010/0106644 A1* | 4/2010 | Annan et al. | 705/42 |
| 2010/0180328 A1* | 7/2010 | Moas et al. | 726/6 |
| 2011/0060913 A1* | 3/2011 | Hird et al. | 713/184 |
| 2011/0145093 A1* | 6/2011 | Paradise et al. | 705/26.41 |
| 2011/0231315 A1* | 9/2011 | Bandyopadhyay et al. | 705/44 |
| 2012/0034951 A1* | 2/2012 | Jones et al. | 455/556.1 |
| 2013/0139238 A1* | 5/2013 | Ryan | 726/7 |

\* cited by examiner

MOBILE PIN PAD

BACKGROUND

Web services are improving security measures by incorporating two-factor authentication methodologies into website access protocols. While some websites require only a single authentication factor, such as a knowledge-based authentication factor (e.g., username and password), an increasing number of websites require two-factor authentication and issue dedicated authentication devices, such as tokens, to registered users to comply with a second, physical, form of authentication (e.g., something that the user physically possesses). A token may use a One Time Password (OTP) generator to generate and display a unique code (e.g., an OTP) every predefined interval (e.g., 30 seconds). A registered user may be required to enter the displayed code after entering a username and a password to be provided with access to a website.

A particular device, such as a token, may only work with a particular issuing website. Consequently, users may accumulate increasing numbers of website-unique devices and may need to bear the burden of possessing, transporting, managing and using multiple devices, of varying types and protocols to access different websites. Alternatively, a software application may be installed on a mobile device (e.g., smart phone) for the mobile device to act as a token for a particular issuing website. A user may need to bear the burden of installing, managing, and/or operating different software applications on a mobile device to access different websites.

Also, a user may need to perform onerous tasks to generate and/or access a code and to manually transpose the code displayed by a mobile device and/or a token. Moreover, web services requiring two-factor authentication may incur the considerable expense and resources to procure, issue, and/or administer website-unique devices and/or software applications.

DETAILED DESCRIPTION OF PREFERRED EMBODIMENTS

The following detailed description refers to the accompanying drawings. The same reference numbers in different drawings may identify the same or similar elements.

An implementation described herein may provide a second form of authentication, for a web service requiring two-factor authentication, via mobile pin pad authentication. For example, a website may require a first form of authentication (e.g., username and password) and a second form of authentication provided via a mobile device that a user physically possesses. The mobile device may be a type of a remote device. The user may proceed to log into the website by entering the user's username and password. A web server hosting the website may receive the username and the password. The web server may determine that the second form of authentication is required. The web server may send an authentication request for the second form of authentication to an authentication server. The authentication server may transmit a message, to receive the second form of authentication, to a mobile device of the user. The user may use the mobile device to indicate whether the user wants to proceed with providing the second form of authentication to log into the website. If the user wants to proceed, the mobile device may display a mobile pin pad. The user may enter a correct personal identification number (PIN) by using the mobile pin pad. The mobile device may generate an OTP, for the second form of authentication, when the user enters the correct PIN. The web server and/or the authentication server may determine whether the second form of authentication was successfully provided by the user based on the OTP. The user may be allowed to log into the website when the second form of authentication was successfully provided.

Figure 1:
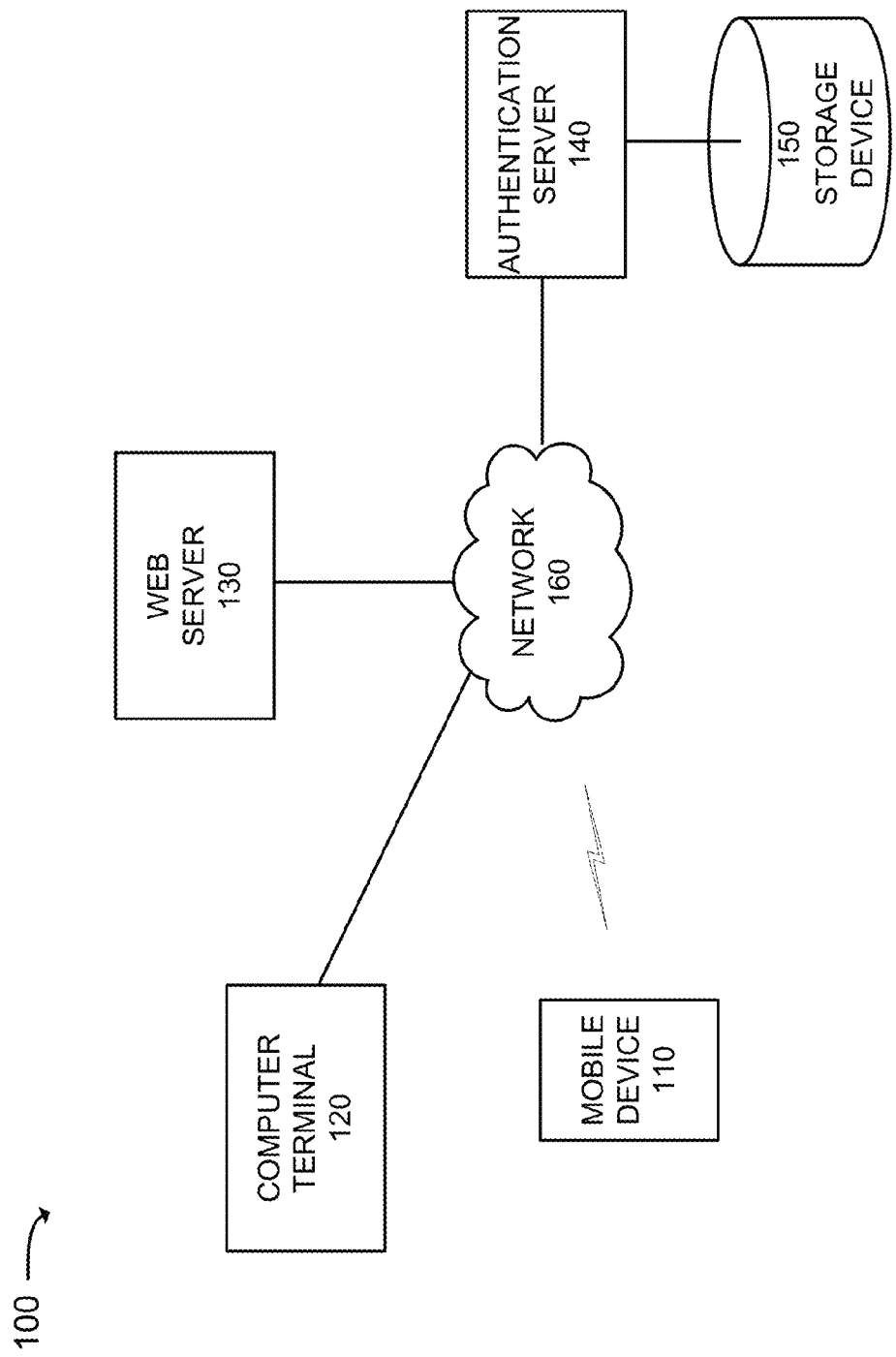
FIG. 1 is a diagram of an example environment in which systems and/or methods described herein may be implemented.

FIG. 1 is a diagram of an example environment 100 in which systems and/or methods described herein may be implemented. Environment 100 may include one or more of the following components: a mobile device 110, a computer terminal 120, a web server 130, an authentication server 140, a storage device 150, and a network 160. In practice, environment 100 may include additional components, fewer components, different components, or differently arranged components than are shown in FIG. 1.

In some implementations, one or more of the components of environment 100 may perform one or more functions described as being performed by another one or more of the components of environment 100. For example, mobile device 110 and computer terminal 120 could be integrated into a single device that performs all or some of the functions described below as being performed by an individual one of these devices. Similarly web server 130, authentication server 140, and storage device 150 could be integrated into a single device that performs all or some of the functions described below as being performed by an individual one of these devices.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Mobile device 110 may include any computation or communication device, such as a communication device that is capable of communicating with authentication server 140 via network 160. In one implementation, mobile device 110 may take the form of a smart phone, a personal digital assistant (PDA), a mobile telephone device, a laptop, a handheld computer, a personal media player, etc. Mobile device 110 may allow a user of mobile device 110 to register to use mobile device 110 as a mobile pin pad by communicating with authentication server 140 and/or another registration server (not shown in FIG. 1). Mobile device 110 may store, access, and/or execute a mobile pin pad software application to use the mobile pin pad. Mobile device 110 may intercept/receive a message from authentication server 140 to authenticate the user of mobile device 110. Mobile device 110 may display a request to a user, for the user to accept or reject a transaction, based on the message and may receive a response to the request from the user. Thereafter, mobile device 110 may display a mobile pin pad and may receive a PIN input from the user. Furthermore, mobile device 110 may verify the PIN input, generate an OTP, and transmit the OTP to authentication server 140.

Computer terminal 120 may include any computation or communication device, such as a communication device that is capable of communicating with web server 130 via network 160. In one implementation, computer terminal 120 may take the form of any computer, including a web service terminal, a personal computer, a laptop, a handheld computer, a smart phone, a mobile telephone device, a personal media player, etc. In one implementation, mobile device 110 may represent and act as computer terminal 120. In another implementation, computer terminal 120 may be a part of web server 130. Computer terminal 120 may be operated by a user of mobile device 110, a merchant (e.g., a store, a gas station, etc.) with which the user interacts (e.g., conducts a transaction), a third party requiring a verification from the user (e.g., an enterprise requiring the user's confirmation/permission and/or digital signature, a party seeking to confirm the user's identity, etc.), etc. Computer terminal 120 may be directly connected to web server 130 through network 160. Computer terminal 120 may allow an operator (e.g., the user of mobile device 110) of computer terminal 120 to access a web service provided by web server 130. Computer terminal 120 may receive an input from the operator. Computer terminal 120 may transmit a transaction request, based on the input, to web server 130. The transaction request may trigger web server 130 to request a second form of authentication for the user of mobile device 110.

Web server 130 may include any computation or communication device, such as a communication device that is capable of communicating with computer terminal 120 and/or authentication server 140 via network 160. Web server 130 may represent a single server device or a collection of multiple server devices and/or computer systems. Web server 130 may handle a transaction (e.g., a request to access web server 130, an online purchase, a request for verification of a person's identity, etc.) initiated at computer terminal 120 by a user of mobile device 110, a merchant, a third party, etc. Web server 130 may require a second form of authentication, in addition to a first form of authentication (the first form of authentication may be knowledge-based (e.g., the user may enter a username and a password), physical-based (e.g., the user may provide a credit card, a rewards card, and/or a smartcard), etc.) already provided by the user of mobile device 110, to process/approve the transaction. Web server 130 may generate and transmit an authentication request to authentication server 140 to receive the second form of authentication for the user of mobile device 110 and/or other additional information (e.g., a current geographical location of mobile device 110, a risk score calculated for the transaction, etc.). Web server 130 may receive an approval for the transaction, based on successfully receiving the second form of authentication, and/or the other additional information from authentication server 140. Web server 130 may transmit transaction directions to computer terminal 120 to notify an operator of computer terminal 120 (e.g., the user of mobile device 110, the merchant, the third party, etc.) that the transaction was processed/approved.

Authentication server 140 may represent a single server device or a collection of multiple server devices and/or computer systems. For example, authentication server 140 may include a registration server, a server to receive and process authentication requests from web server 130, a server to query a Universal Identity Directory (UID) (e.g., storage device 150) that stores/maintains information about different users, a server (e.g., SMS gateway) to communicate with mobile device 110, an OTP engine server to handle verification/authentication of an OTP received from mobile device 110, a risk engine server to calculate a risk score for a transaction, a server to store information about different transactions (in, for example, storage device 150), etc. In another implementation, the aforementioned servers may be combined into two or more servers that are represented by authentication server 140 and/or storage device 150.

Authentication server 140 may handle a registration of a user of mobile device 110 and a set up of mobile device 110 for mobile device 110 to be used as a mobile pin pad for mobile pin pad authentication. Authentication server 140 may communicate with other internal and external sources of information (e.g., Equifax, LexisNexis, etc.) and/or entities (e.g., trusted agents used to verify identities of potential users) that are necessary to complete the registration process. Authentication server 140 may store information about the user and mobile device 110 (including, for example, a seed value corresponding to mobile device 110 necessary to generate/verify an OTP at a point in time) in storage device 150 and/or another memory (e.g., UID).

Authentication server 140 may receive an authentication request for a transaction from web server 130 via network 160. Authentication server 140 may query, for example, the UID to retrieve mobile phone information for mobile device 110. Authentication server 140 may generate and transmit, to mobile device 100, a message for the transaction to prompt the user through an authentication process using a mobile pin pad. Authentication server 140 may receive a confirmation of the user's desire to proceed with the transaction, a PIN entered by the user of mobile device 110, and/or an OTP generated by mobile device 100 after the user entered the correct PIN. Authentication server 140 may verify that the OTP provided by mobile device 110 is correct (e.g., the OTP may be correct when the OTP matches a comparison OTP generated by authentication server 140). Authentication server 140 may calculate a risk score for the transaction and store (log) information about the transaction in, for example, storage device 150. Authentication server 140 may generate and transmit, to web server 130, an authentication response, which approves or denies the transaction and/or provides other information (e.g., the risk score, etc.).

Storage device 150 may include a device to write, read, and/or store information. Storage device 150 may represent a UID, one or more storage servers, and/or databases. For example, storage device 150 may store information about users, information about mobile devices (e.g., mobile device 110) associated with one or more of the users that can be used for mobile pin pad authentication, information about transactions associated with the users, and/or other information that may be needed to provide mobile pin pad authentication and/or that may be used to calculate risk scores, etc. In one implementation, storage device 150 may be a part of authentication server 140. In another implementation, storage device 150 may connect to authentication server 140 through network 160.

Network 160 may include a single network, multiple networks of a same type, or multiple networks of different types. For example, network 160 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, a fiber optic network (e.g., a fiber optic service (FiOS) network), or any combination of the aforementioned networks.

Figure 2:
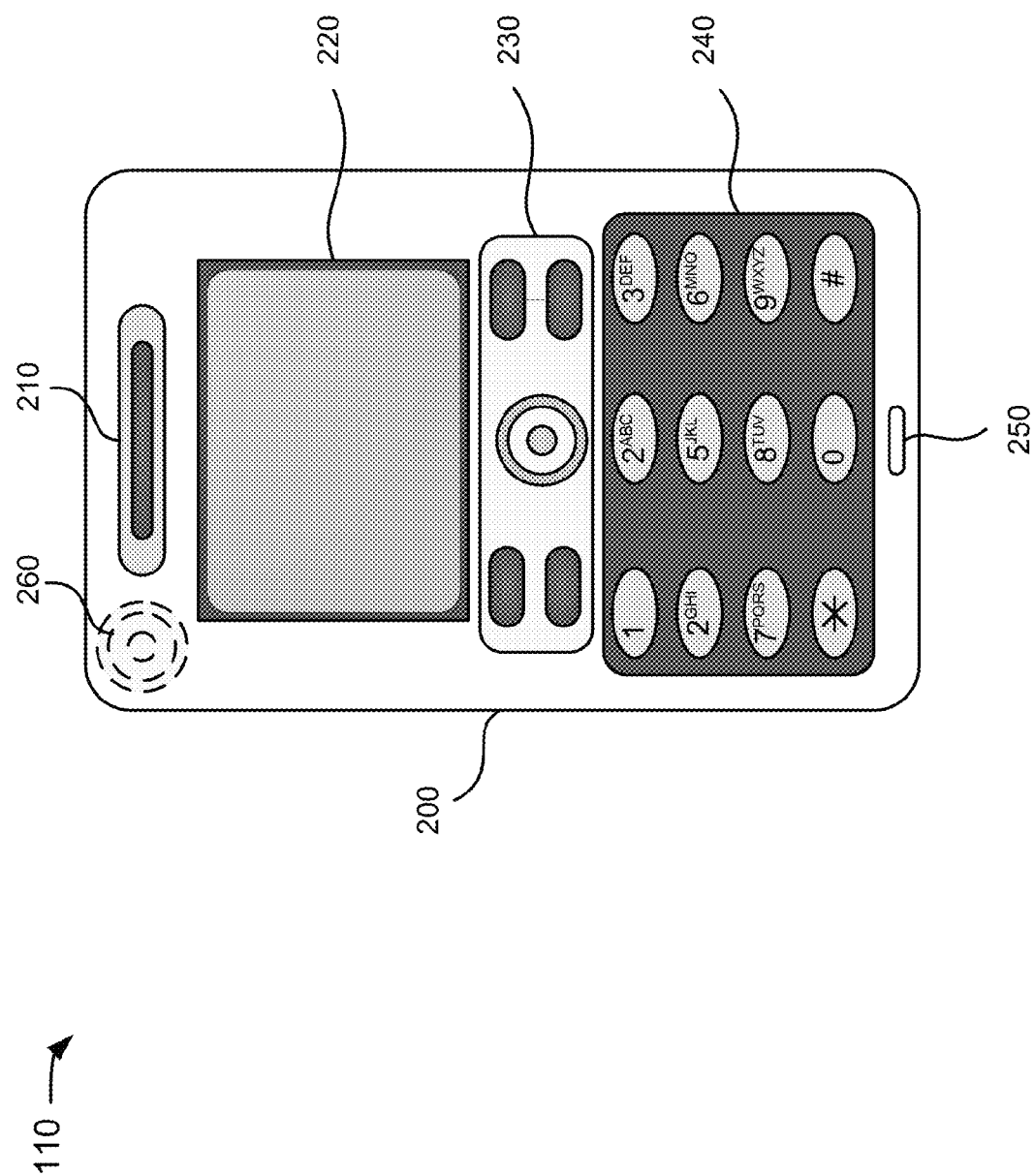
FIG. 2 is a diagram of example components of a mobile device of FIG. 1.

FIG. 2 is a diagram of example components of mobile device 110. As shown in FIG. 2, mobile device 110 may include a housing 200, a speaker 210, a display 220, control buttons 230, a keypad 240, a microphone 250, and/or a camera 260. Housing 200 may include a chassis on which some or all of the components of mobile device 110 are mechanically secured and/or covered. Speaker 210 may include a component to receive input electrical signals from mobile device 110 and transmit audio output signals, which communicate audible information to a user of mobile device 110.

Display 220 may include a component to receive input electrical signals and present a visual output in the form of text, images, videos and/or combinations of text, images, and/or videos which communicate visual information to the user of mobile device 110. In one implementation, display 220 may display text input into mobile device 110, text, images, and/or video received from another device, and/or information regarding incoming or outgoing calls or text messages, emails, media, games, phone books, address books, the current time, etc.

Control buttons 230 may include one or more buttons that accept, as input, mechanical pressure from the user (e.g., the user presses a control button or a combination of control buttons) and may send electrical signals to processing unit 320 that may cause mobile device 110 to perform one or more operations. For example, control buttons 230 may be used to cause mobile device 110 to transmit information. Keypad 240 may include a standard telephone keypad, keyboard, or another arrangement of keys. In an alternative implementation, keypad 240 may be presented as part of display 220.

Microphone 250 may include a component to receive audible information from the user and send, as output, an electrical signal that may be stored by mobile device 110, transmitted to another user device, or cause the device to perform one or more operations. Camera 260 may be provided on a back side of mobile device 110, and may include a component to receive, as input, analog optical signals and send, as output, a digital image or video that can be, for example, viewed on the display 210, stored in the memory of mobile device 110, discarded and/or transmitted to another mobile device 110.

Although FIG. 2 depicts example components of mobile device 110, in other implementations, mobile device 110 may contain fewer, additional, different, or differently arranged components than illustrated in FIG. 2. For example, mobile device 110 may also include one or more components described below with reference to FIG. 3. In still other implementations, one or more components of mobile device 110 may perform one or more tasks described as being performed by one or more other components of mobile device 110.

Figure 3:
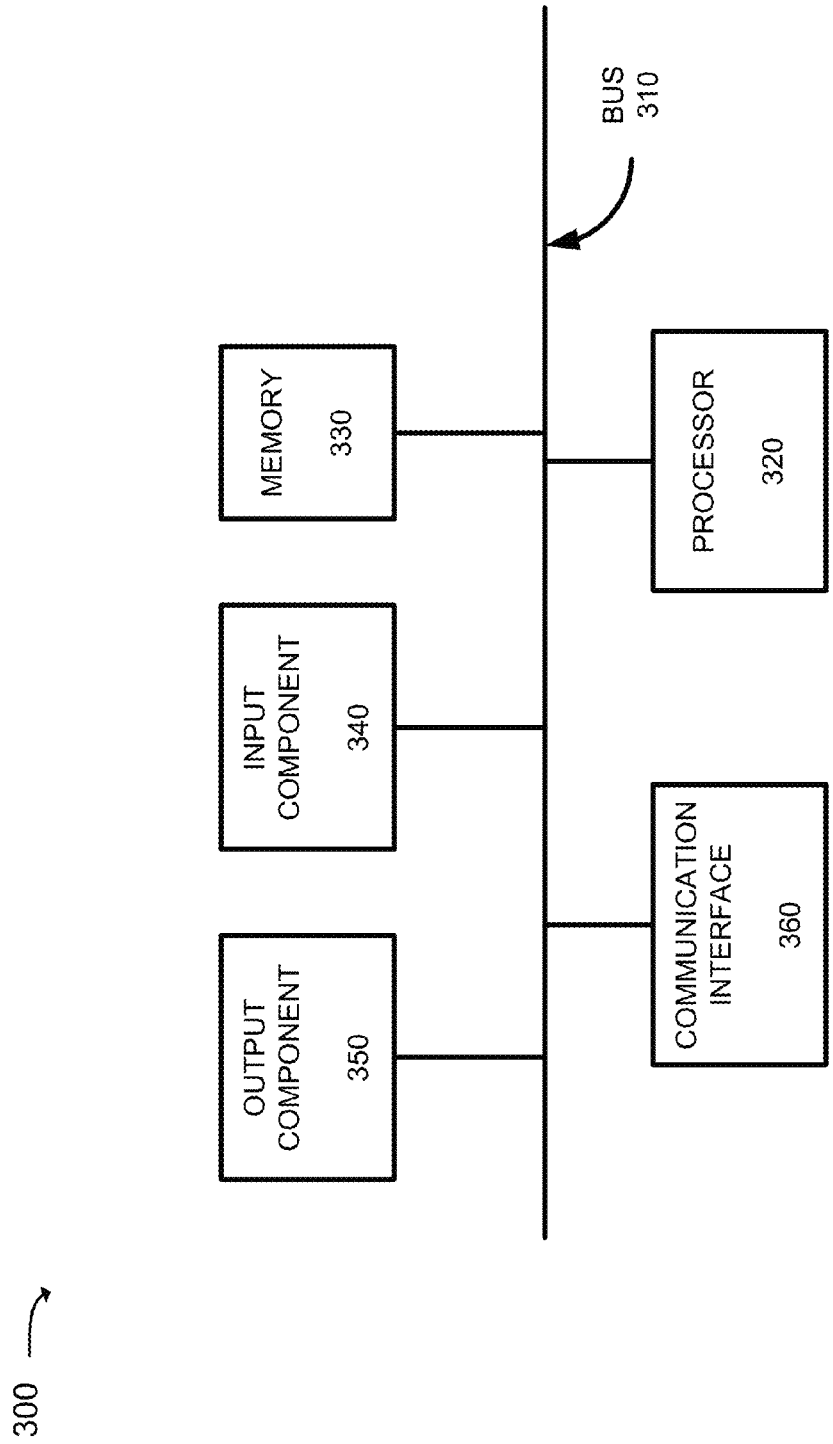
FIG. 3 is a diagram of example components of one or more of the devices of FIG. 1.

FIG. 3 is a diagram of example components of a device 300 that may be associated with mobile device 110, computer terminal 120, web server 130, authentication server 140, and/or storage device 150. Each one of mobile device 110, computer terminal 120, web server 130, authentication server 140, and storage device 150 may include one or more devices 300 and/or one or more of each one of the components of device 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include one or more input mechanisms that permit a user to input information to device 300. Output component 350 may include one or more output mechanisms that output information to the user. Examples of input and output mechanisms may include buttons (e.g., control buttons 230, keys of keypad 240 or a keyboard, a mouse, a joystick, etc.); a touch screen interface to permit data and control commands to be input into user device 110; a speaker (e.g., speaker 210) to receive electrical signals and output audio signals; a microphone (e.g., microphone 250) to receive audio signals and output electrical signals; a display (e.g., display 220) to output visual information (e.g., web pages, transaction information, mobile pin pad interface, etc.); a vibrator to cause user device 110 to vibrate; a camera (e.g., camera 160) to receive video and/or images; etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit them over the air, and receive RF signals over the air and provide them to communication interface 360. In one implementation, for example, communication interface 360 may communicate with network 160 and/or devices connected to network 160.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.) or other forms of RAM or ROM. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
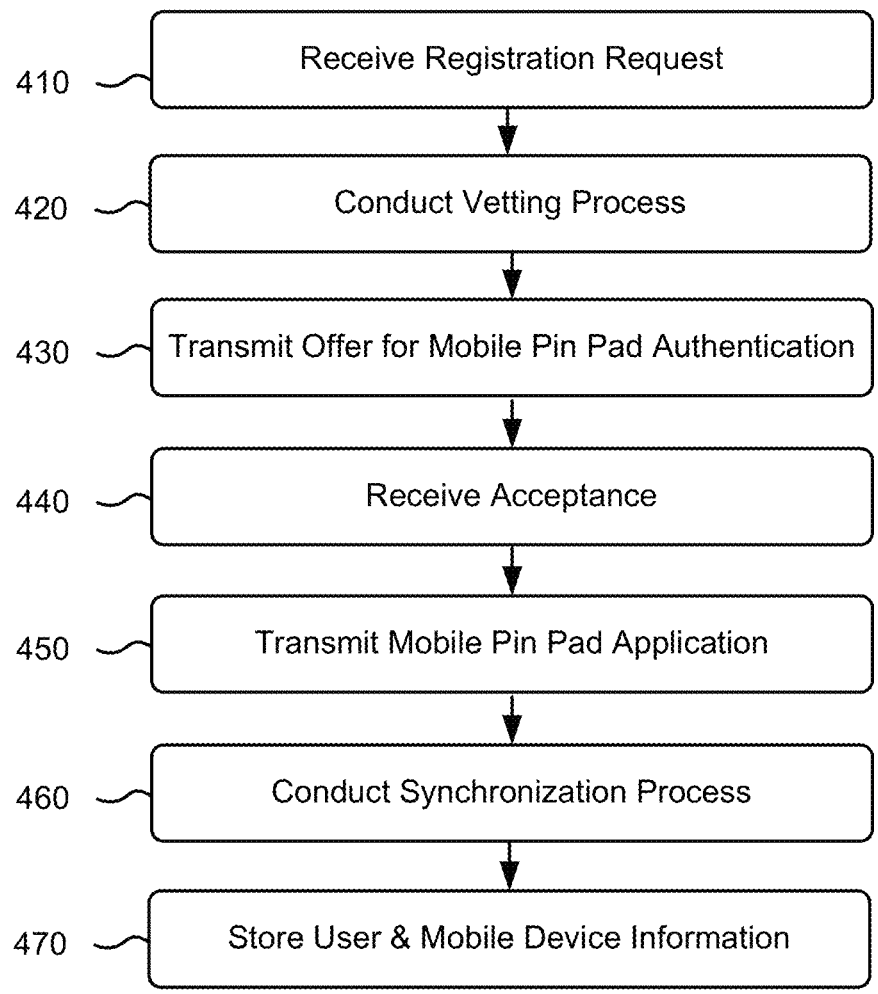
FIG. 4 is a flowchart of an example process for registering a user of a mobile device.

FIG. 4 is a flowchart of an example process 400 for registering a user of mobile device 110. In one implementation, process 400 may be performed by authentication server 140. In another implementation, some or all of process 400 may be performed by a device or collection of devices separate from, or in combination with, authentication server 140.

As shown in FIG. 4, process 400 may include receiving a registration request (block 410). In one implementation, a user of mobile device 110 may decide to register for a universal identity service (UIS) that is provided by a third party (e.g., Verizon) in order to be able to participate in transaction (s) (e.g., gain access to a web site, complete a purchase, order a service, etc.) that allow or require to provide a second form of authentication via mobile pin pad authentication. To register for the UIS, the user may use mobile device 110 to access a registration website provided by authentication server 140. In another implementation, the user of mobile device 110 may be redirected to the registration website while accessing a relying application website (herein, the relying application) provided by web server 130. The relying application may allow or require the second form of authentication via the mobile pin pad authentication.

The registration website, displayed on mobile device 110, may prompt the user to enter identifying information (e.g., a first name, a last name, an address, a phone number, credit card information, etc.) to register for the UIS using mobile device 110. Mobile device 110 may transmit, to authentication server 140, the entered identifying information as part of a registration request for the user. Authentication server 140 may receive the registration request via network 160 from mobile device 110. In another implementation, a user may register for the UIS with mobile device 110 by using a different computing device (e.g., computer terminal 120) than mobile device 110.

A vetting process may be conducted (block 420). For example, authentication server 140 may determine what additional steps need to be taken in order to confirm an identity of a user of mobile device 110 up to a level required for the user to be provided with the ability to use mobile device 110 for mobile pin pad authentication. In one implementation, authentication server 140 may have direct access (e.g., via a directory related to an UIS) to additional information about a person identified by identifying information in a registration request received from mobile device 110. In another implementation, authentication server 140 may obtain additional information about the person identified by the identifying information from third parties (e.g., Equifax, LexisNexis, etc.). Authentication server 140 may generate a challenge question in the form of a quiz based on the additional information. Authentication server 140 may transmit the challenge question to mobile device 110 to confirm that the user of mobile device 110 matches the person identified by the identifying information. Authentication server 140 may continue to generate and transmit new challenge questions until authentication server 140 is able to confirm the user as the person identified by the identifying information up to the level required for the user to use mobile pin pad authentication.

In yet another implementation, authentication server 140 may determine that the user of mobile device 110 needs to be approved by a trusted agent for the user to be registered in the UIS and/or to be able to use mobile pin pad authentication. The trusted agent may be a party who has already been vetted by the authentication server, a party who has a dedicated role for approving new users, an entrusted individual (e.g., notary), etc. The trusted agent may transmit information to authentication server 140 in order to confirm the identity of the user of mobile device 110, who initiated registration process 400, as the person identified by the identifying information in the registration request. The vetting process may be completed once the authentication server determines that the user may be registered.

As further shown in FIG. 4, an offer for mobile pin pad authentication may be transmitted (block 430). For example, based on the vetting process, authentication server 140 may determine whether an identity of a user of mobile device 110 has been vetted sufficiently to allow the user to use mobile pin pad authentication. If so, after concluding the vetting process, authentication server 140 may generate an offer to allow the user to use mobile pin pad authentication. Authentication server 140 may transmit the offer to mobile device 110.

An acceptance may be received (block 440). For example, mobile device 110 may display an offer to use mobile pin pad authentication to a user of mobile device 110. The user may request, and authentication server 140 may provide in response, additional information about the mobile pin pad authentication. The user may use mobile device 110 to enter an acceptance of the offer to use the mobile pin pad authentication. Mobile device 110 may transmit the acceptance to authentication server 140. Authentication server 140 may receive the acceptance from mobile device 110 via network 160.

A mobile pin pad application may be transmitted (block 450). For example, in response to receiving an acceptance of an offer to use mobile pin pad authentication, authentication server 140 may determine what version of an application should be transmitted to mobile device 110 to act as the mobile pin pad application. In one implementation, authentication server 140 may determine the version based on specifications (e.g., model, operating system, data network, etc.) of mobile device 110. In other implementations, the acceptance to the offer may include preferences provided by the user that are related to the version of the mobile pin pad application. Accordingly, authentication server 140 may determine the version of the mobile pin pad application based on the specifications of mobile device 110 and/or the preferences provided by the user. Authentication server 140 may transmit the mobile pin pad application to mobile device 110.

A synchronization process may be conducted (block 460). For example, authentication server 140 may conduct a synchronization process before, after, during, or at the same time as receiving an acceptance (block 440) and/or transmitting a mobile pin pad application (block 450). After the synchronization process is complete, authentication server 140 may have a capability to verify an OTP generated by mobile device 110 during mobile pin pad authentication. For example, after mobile device 110 receives the mobile pin pad application, a user of mobile device 110 may be guided through installation and set up of the mobile pin pad application on mobile device 110. A user may be requested to select and enter a PIN (e.g., 1234) that may be used for mobile pin pad authentication. The mobile pin pad application on mobile device 110 may transmit back to authentication server 140 mobile device information associated with mobile device 110, including a seed value to be used by mobile device 110 to generate an OTP. In another implementation, authentication server 140 may transmit the seed value for mobile device 110 to mobile device 110.

During mobile pin pad authentication, a user may be prompted to enter a correct PIN in order for the mobile pin pad application to generate the OTP based on the seed value. The OTP may be transmitted to authentication server 140. An OTP engine of authentication server 140 may generate a comparison OTP, for mobile device 110, also based on the seed value. Authentication server 140 may determine whether the OTP transmitted from mobile device 110 matches the comparison OTP. Authentication server 140 may authenticate a user of mobile device 110 for a transaction when the OTP transmitted from mobile device 110 is equivalent to the comparison OTP.

Turning back to FIG. 4, user and mobile device information may be stored (block 470). Authentication server 140 may store information received from mobile device 110 throughout process 400. For example, authentication server 140 may store identifying information regarding a user of mobile device 110 that is received before and during the vetting process. Authentication server 140 may store the identifying information in a UID that is organized/maintained on storage device 150 or on other storage device(s) and/or server(s) (not shown in FIG. 1). Authentication server 140 may assign a unique ID to correspond to the identifying information for the user. The identifying information may include, for example, a phone number of mobile device 110 (or another type of identifier for mobile device 110), a first name, a last name, a username, an email address, a credit card number, etc. Authentication server 140 may also store mobile device information received during the synchronization process from mobile device 110. Authentication server 140 may use the mobile device information to validate the OTP received from mobile device 110 during mobile pin pad authentication.

Figure 5:
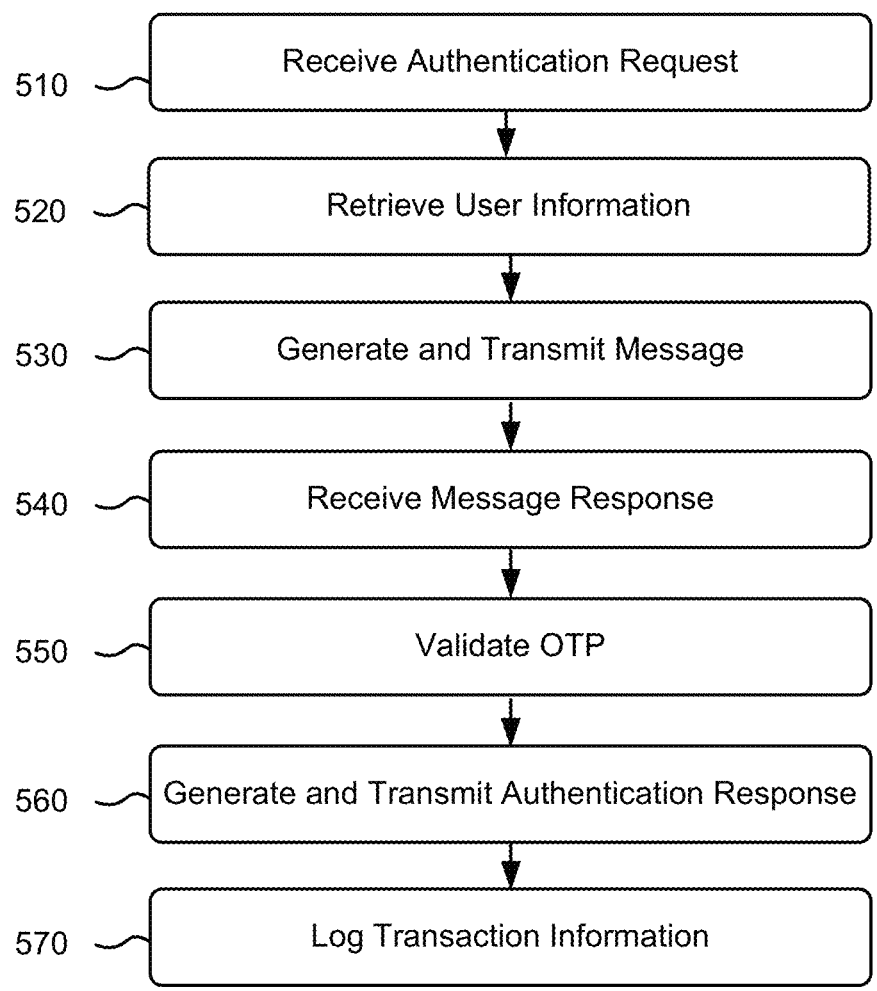
FIG. 5 is a flowchart of an example process for providing mobile pin pad authentication.

FIG. 5 is a flowchart of an example process 500 for providing mobile pin pad authentication by authentication server 140. In one implementation, process 500 may be performed by authentication server 140. In another implementation, some or all of process 500 may be performed by a device or collection of devices separate from, or in combination with, authentication server 140.

Prior to process 500, a user of mobile device 110 may initiate a transaction. In one example, the user may use computer terminal 120 to access a website associated with web server 130, which requires a two-factor authentication. The user may enter a username and a password for a first form of authentication for a transaction, such as, logging into the website. Web server 130 may receive, from computer terminal 120, a login request for access to the website. The login request may include the username and the password. Web server 130 may receive the login request and determine that the transaction (e.g., of logging into the website)/web server 130 needs a second form of authentication for web server 130 to approve the login request. Accordingly, web server 130 may transmit an authentication request to authentication server 140 for authentication server 140 to conduct mobile pin pad authentication to receive the second form of authentication. The authentication request may include information about the transaction (including, for example, a relying application unique transaction ID (e.g., an ID assigned by web server 130 for the login request), a transaction type (e.g., login request authentication, etc.) and the user (e.g, identifying information of the user).

In another example, the user may proceed to a merchant (e.g., gas station, department store, etc.) to make a purchase. The user may request an operator of computer terminal 120, located at a location of the merchant, to pay for the purchase by using a digital wallet associated with the user. Authentication server 140 may have access to/store information about the digital wallet. The digital wallet may be associated with one or more accounts (e.g., a credit card account, a checking account, a digital wallet account (e.g., a user may transfer money from another account to the digital wallet account, etc.) of the user. The user may present to the operator a first form of identification (e.g., a reward card) to serve as a first form of authentication for a transaction of making the purchase using the digital wallet. The operator may use computer terminal 120 to transmit information about the transaction and the first form of identification to web server 130. To receive a second form of authentication for the user via mobile pin pad authentication, web server 130 may transmit an authentication request for the transaction to authentication server 140. The authentication request may include information about the transaction (e.g., a description of the purchase, an identifier of the merchant, geographic location coordinates of the merchant, etc.) and the user and a description of what information is being requested (e.g., an authentication request for the transaction, a risk score, geographic location coordinates of mobile device 110, etc.).

In yet another example, a user of mobile device 110 may be a person whose verification is required to approve a transaction (e.g, an executive who needs to give approval for a decision, a doctor who needs to verify a drug prescription for a patient, a parent who needs to provide permission, in a form of a digital signature, for his child, a person who needs to verify her identity to use a credit card to pay online, a first responder who needs to verify her identity when she arrives at an accident scene, etc.). A third party may use computer terminal 120 and/or web server 130 to request the verification for the transaction through mobile pin pad authentication. Web server 130 may receive a transaction request for the transaction and transmit an authentication request, based on the transaction request, to authentication server 140.

As shown in FIG. 5, process 500 may include receiving an authentication request (block 510). For example, as discussed above, web server 130 may process a transaction based on a transaction request that web server 130 received from computer terminal 120. Web server 130 may determine that additional (e.g., a second form of) authentication is necessary to approve/allow the transaction. The additional authentication may be obtained via mobile pin pad authentication. To initiate the process for the additional authentication, web server 130 may generate an authentication request. The authentication request may include a transaction identifier assigned by a relying application requiring the additional authentication (e.g., a website associated with web server 130), an identifier corresponding to a user of mobile device 110 (e.g., a user ID, a phone number, a username, an email address, a credit card number, a reward card number, etc.), one or more transaction types that describes the purpose(s) of the authentication request (e.g., authentication approval, credit card transaction, geographic location request, risk score request, etc.), instructional text to describe the transaction to the user of mobile device 110 (e.g., "Would you like to provide mobile pin pad authentication to login into a website? (Yes/No)"), transaction geographic location (e.g., coordinates of where a purchase is being made (i.e., where computer terminal 120 is located)), a length of time that the relying application will wait for an authentication response (herein, timeout time), etc. Web server 130 may transmit the authentication request to authentication server 140. Authentication server 140 may receive the authentication request, via network 160, from web server 130.

User information may be retrieved (block 520). For example, authentication server 140 may determine a user identifier, for a user of mobile device 110 for whom an authentication request is received, that is included in the authentication request. A phone number for mobile device 110 may be stored in association with the user identifier in a UID of storage device 150. Authentication server 140 may retrieve the phone number for mobile device 110, based on the user identifier, from storage device 150.

A message may be generated and transmitted (block 530). For example, authentication server 140 may determine based on an authentication request received from web server 130 that web server 130 needs a second form of authentication for a user of mobile device 110 and/or other information (e.g., geographic location of mobile device 110) for a transaction. Authentication server 140 may generate a message based on the authentication request. The message may prompt mobile device 110 to execute a mobile pin pad application for mobile pin pad authentication and to provide other information needed by web server 130 to approve/process the transaction. The message may include information to describe the transaction to the user (e.g., a name corresponding to a relying application of web server 130 (e.g., a name of a website that the user is trying to access using computer terminal 120, a name of a merchant where computer terminal 120 is located and where a user is making a purchase, etc.), instructional text, etc.) and may prompt the mobile pin pad application to provide correct information in response (e.g., an OTP generated as a result of mobile pin pad authentication, geographic location coordinates of mobile device 110, etc.). Authentication server 140 may transmit the message to mobile device 110, via network 160, by using a retrieved phone number of mobile device 110.

A message response may be received (block 540). For example, mobile device 110 may receive a message from authentication server 140. A mobile pin pad application (or another application executing on mobile device 110) that is installed on mobile device 110 may recognize that the message is intended for the mobile pin pad application. Accordingly, the mobile pin pad application may receive the message. Mobile device 110 may display instructions to a user of mobile device 110 to describe a transaction corresponding to the message and to prompt the user to accept or reject the transaction. Mobile device 110 may receive a selection from the user in response to the instructions. If the user selects to accept the transaction, mobile device 110 may display a mobile pin pad. Mobile device 110 may receive a PIN input entered by the user using mobile device 110. Mobile device 110 may determine whether the PIN input matches a PIN stored, by mobile device 110, for the user of mobile device 110. If the PIN input matches the stored PIN, mobile device 110 may use an OTP generator to generate an OTP.

In another implementation, mobile device 110 may generate the OTP after the user selects to accept the transaction, without requiring the user to enter a PIN, when criteria are met. The criteria may be met when the user entered the PIN within a predefined period of time (e.g., 10 minutes), mobile device 110 is within a predefined radius of a location (e.g., a hospital where the user is a nurse accessing a workstation, a store where the user is a customer making a purchase, a residence of a user or another location corresponding to the user, etc.), and/or any other criteria set by the user, an operator of web server 130, and/or an operator of authentication server 140. In yet another implementation, the user may be required to select another "Accept" button to generate the OTP instead of entering the PIN when the criteria are met.

Mobile device 110 may generate a message response based on the OTP. The message response may also include other information that was requested in the message from authentication server 140 (including, for example, geographic location coordinates of mobile device 110). Mobile device 110 may transmit the message response to authentication server 140. Authentication server 140 may receive the message response, via network 160, from mobile device 110.

As further shown in FIG. 5, an OTP may be validated (block 550). For example, after receiving a message response from mobile device 110, authentication server 140 may generate a comparison OTP for mobile device 110. An algorithm and information (e.g., a seed value) used to generate the comparison OTP by authentication server 140 may be the same as the algorithm and information that were used by mobile device 110 to generate an OTP included in the message response. Authentication server 140 may determine whether the OTP included in the message response matches the comparison OTP. If the OTP included in the message response matches the comparison OTP, the OTP included in the message response may be validated. As a result, the user of mobile device 100 may be authenticated and the transaction may be approved.

An authentication response may be generated and transmitted (block 560). For example, after a transaction is approved due to the authenticating of a user of mobile device 110 via mobile pin pad authentication, authentication server 140 may generate an authentication response. The authentication response may include information to notify web server 130 that the second form of authentication was successfully received and that, accordingly, the transaction is approved. The authentication response may further include a transaction identifier, assigned by a relying application of web server 130, which was included in the authentication request transmitted by web server 130 to authentication server 140.

The authentication response may also include other information requested by web server 130. In one implementation, the authentication response may include geographic location coordinates of mobile device 110. In another implementation, the authentication response may include a risk score calculated for the transaction. A risk score engine of authentication server 140 may calculate the risk score based on a variety of factors, including, for example, the geographic location coordinates of mobile device 110 at the time of the transaction/the mobile pin pad authentication, the user's prior usage pattern (e.g., other transactions that were previously approved for the user), etc. For example, the risk engine may compare the geographic location coordinates of mobile device 110 and geographic location coordinates of computer terminal 120 (located, for example, where the user is participating in a transaction (e.g., making a purchase)). A better risk score may be assigned when areas associated with the geographic location coordinates coincide.

Authentication server 140 may also generate an authentication response when a transaction is denied. A transaction may be denied for one or more different reasons. In one example, authentication server 140 may determine that a unique transaction identifier, assigned by a relying application of web server 130, that was included in the authentication request received from web server 130 is invalid (e.g., authentication server 140 does not support the relying application). In a further example, authentication server 140 may determine that no user information is stored (in, for example, a UID of storage device 150) for a user corresponding to a user identifier included in the authentication request, that the user information stored for the user does not include information about a mobile device corresponding to the user, or that the mobile device information that is stored for the user does not indicate that the mobile device may be used for mobile pin pad authentication (for, for example, the relying application).

In another example, mobile device 110 may fail to receive the message to prompt mobile pin pad authentication, a user of mobile device 110 may reject proceeding with the transaction, and/or the user of mobile device 110 may fail to enter a correct PIN after accepting the transaction. As a result, mobile device 110 may fail to transmit a message response to authentication server 140 in response to the message from authentication server 140. After a predefined period of time of waiting for the message response (after sending the message), authentication server 140 may determine that a timeout has occurred and cease waiting for the message response. In another implementation, mobile device 110 may transmit a message response that indicates that the user rejected proceeding with the transaction or failed to enter a correct PIN. In yet another example, mobile device 110 may transmit a message response that includes an OTP that cannot be validated by authentication server 140 (e.g., the OTP does not match a comparison OTP generated by authentication server 140).

Authentication server 140 may determine that a transaction needs to be denied for one or more of the aforementioned reasons that did not allow the completion of the mobile pin pad authentication for the transaction. Authentication server 140 may generate an authentication response based on the failure(s) that indicate that the transaction should be denied. The authentication response may also include, for example, a unique transaction identifier assigned by the relying application of web server 130 and/or one or more reason codes. The reason codes (e.g, A1) may correspond to one or more reasons why the failure occurred and/or why the transaction should be denied (e.g., invalid unique transaction identifier, no mobile device registered for a user identified in the authentication request, failure to validate OTP received from mobile device 110, timeout after waiting for a message response from mobile device 110, a user of mobile device 110 rejected proceeding with the transaction, etc.).

The authentication response may be transmitted to web server 130 via network 160. Web server 130 may determine whether to proceed with the transaction based on the authentication response, including, for example, the risk score. In other implementations, authentication server 140 may transmit information about the successful authentication and the transaction approval in one message, and may transmit one or more separate messages for the other information requested by web server 130.

As also shown in FIG. 5, transaction information may be logged (block 570). For example, after determining whether a transaction corresponding to an authentication request received from web server 130 is approved or denied, authentication server 140 may log transaction information about the transaction. Logging the transaction information may include, for example, storing the transaction information in storage device 150. The transaction information may be stored in association with information about a user already stored in a UID or may be stored independently with other transactions corresponding to the user. The transaction information may include, for example, an identity of the user of mobile device 110; an identity of a relying application of web server 130 that requested, via an authentication request from web server 130, mobile pad authentication; instructions included in the authentication request; geographic location coordinates of mobile device 110; identity information and/or geographic location coordinates of computer terminal 120 (e.g., located where the user is participating in a transaction (e.g., making a purchase)); and/or a result of the mobile pin pad authentication (i.e., whether the transaction was approved or denied). A risk engine of authentication server 140 may use the transaction information logged for a specific user and/or a specific relying application to calculate risk scores for other transactions.

Figure 6:
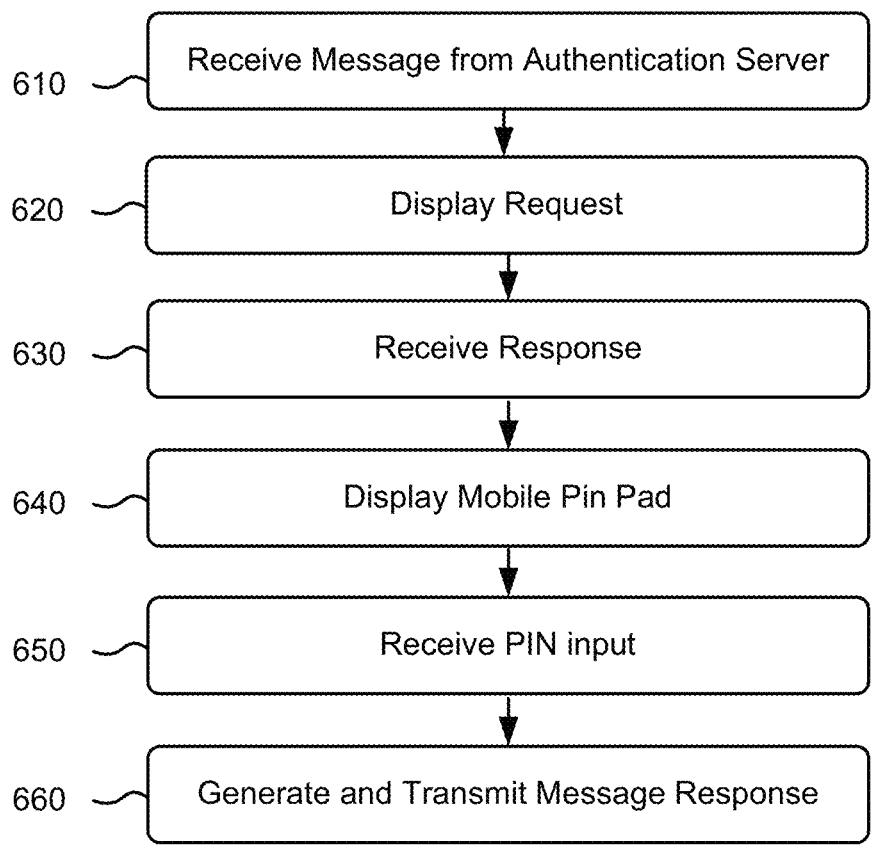
FIG. 6 is a flowchart of an example process for conducting mobile pin pad authentication by a mobile pin pad application.

FIG. 6 is a flowchart of an example process 600 for conducting mobile pin pad authentication by a mobile pin pad application. In one implementation, process 600 may be performed by mobile device 110. In another implementation, some or all of process 600 may be performed by a device or collection of devices separate from, or in combination with, mobile device 110.

As shown in FIG. 6, process 600 may include receiving a message from authentication server 140 (block 610). For example, a user may register with authentication server 140. Authentication server 140 may store/have access to information for mobile device 110 corresponding to the user that may be used for mobile pin pad authentication. A mobile pin pad application may be installed on mobile device 110. The mobile pin pad application may allow mobile device 110 to generate an OTP that may be validated by authentication server 140 for a transaction. A user may initiate a transaction that requires computer terminal 120 to communicate with web server 130 to complete the transaction. Web server 130 may require a second form of authentication from the user. Web server 130 may transmit an authentication request to authentication server 140 to receive the second form of authentication for the user via mobile pin pad authentication. Authentication server 140 may retrieve information for mobile device 110, corresponding to the user, that may be used to perform the mobile pin pad authentication for the user. Authentication server 140 may generate and transmit a message to mobile device 110 to prompt the mobile pin application of mobile device 110 to conduct the mobile pin pad authentication. The mobile pin application (or another application executing on mobile device 110) of mobile device 110 may recognize the message received from authentication server 140 and receive the message.

A request may be displayed (block 620). For example, a message received from authentication server 140 may include instructions describing a transaction for which mobile pin pad authentication is being performed and describing information being requested (for example, the instructions may indicate that the message is a request to authorize access to a secure web site, a request to authorize a payment (e.g., by using a digital wallet, etc.), or a request to provide geographic location coordinates of mobile device 110 to corroborate transaction geographic location of computer terminal 120 (e.g., are you physically located in proximity to the location of a physical or virtual point of sale)). Mobile device 110 may display a request based on the instructions on a display screen of mobile device 110.

A response may be received (block 630). For example, a request displayed on a display screen of mobile device 110 may prompt a user of mobile device 110 to enter or select one or more symbols corresponding to "Yes" or "No" (e.g., Y, N) in order to accept or reject the request. Mobile device 110 may receive a response entered by the user. In another example, mobile device 110 may determine whether the user entered/selected a proper response (e.g, the response corresponds to one of "Yes" or "No") and prompt the user to again enter or select a new response if the previous response was not a proper response.

A mobile pin pad may be displayed (block 640). For example, after receiving a response from a user of mobile device 110 in response to a request, mobile device 110 may determine whether the user desires to proceed with the transaction based on the response. If mobile device 110 determines that the user desires to proceed with the transaction (i.e., the user accepted the request), mobile device 110 may display a mobile pin pad on a display screen of mobile device 110. In one example, the mobile pin pad may have an appearance of a pin pad displayed by an ATM machine. The mobile pin pad may include slots for each one of the digits in a PIN that corresponds to the user of mobile device 110 (e.g., display device may have four slots for PIN "4 3 1 2").

In another implementation, a user of mobile device 110 may be prompted to enter a password instead of the PIN. The password may include numbers, letters, and/or symbols. In yet another implementation, a user of mobile device 110 may be prompted to provide biometric information associated with the user (e.g., a retina scan, a voice signature, a facial signature, a fingerprint, etc.), by using a biometric device (e.g., a camera, a laser scanner, a microphone, etc.) of/connected to mobile device 110, instead of the PIN. Herein, any reference to the PIN may also refer to the password and/or the biometric information.

As further shown in FIG. 6, a PIN input may be received (block 650). For example, a mobile pin pad displayed on mobile device 110 may prompt a user of mobile device 110 to enter a PIN input. The PIN input may refer to digits entered by the user (e.g., 4 3 1 2) for a PIN. A mobile pin pad application of mobile device 110 may receive the PIN input and determine whether the PIN input matches a PIN stored for the user. In some implementations, if the PIN input does not match the PIN stored for the user, the mobile pin pad application may display a mobile pin pad (block 640) again. The mobile pin pad may be displayed a predefined number of times until a PIN input is received that matches the PIN stored for the user.

A message response may be generated and transmitted (block 660). For example, a mobile pin pad application of mobile device 110 may determine whether a user of mobile device 110 (eventually) entered a correct PIN (i.e., a PIN input matches a PIN stored for the user). If the correct PIN was entered, the mobile pin pad application of mobile device 110 may generate an OTP based on a seed value. The seed value may have been provided by authentication server 140 to mobile device 110 during the registration process and/or when the mobile pin pad application was provided to mobile device 110 by authentication server 140. Mobile device 110 may generate and transmit a message response to authentication server 140 that includes the OTP. The message response may also include other information requested in a message received from authentication server 140, including, for example, geographic location coordinates of mobile device 110. Authentication server 140 may generate a comparison OTP, also based on the seed value, after receiving the message response from mobile device 110. Authentication server 140 may compare the OTP included in the message response to the comparison OTP to determine whether a transaction corresponding to the message response should be approved (if the OTP included in the message response matches the comparison OTP) or denied (if the OTP included in the message response does not match the comparison OTP).

Figure 7:
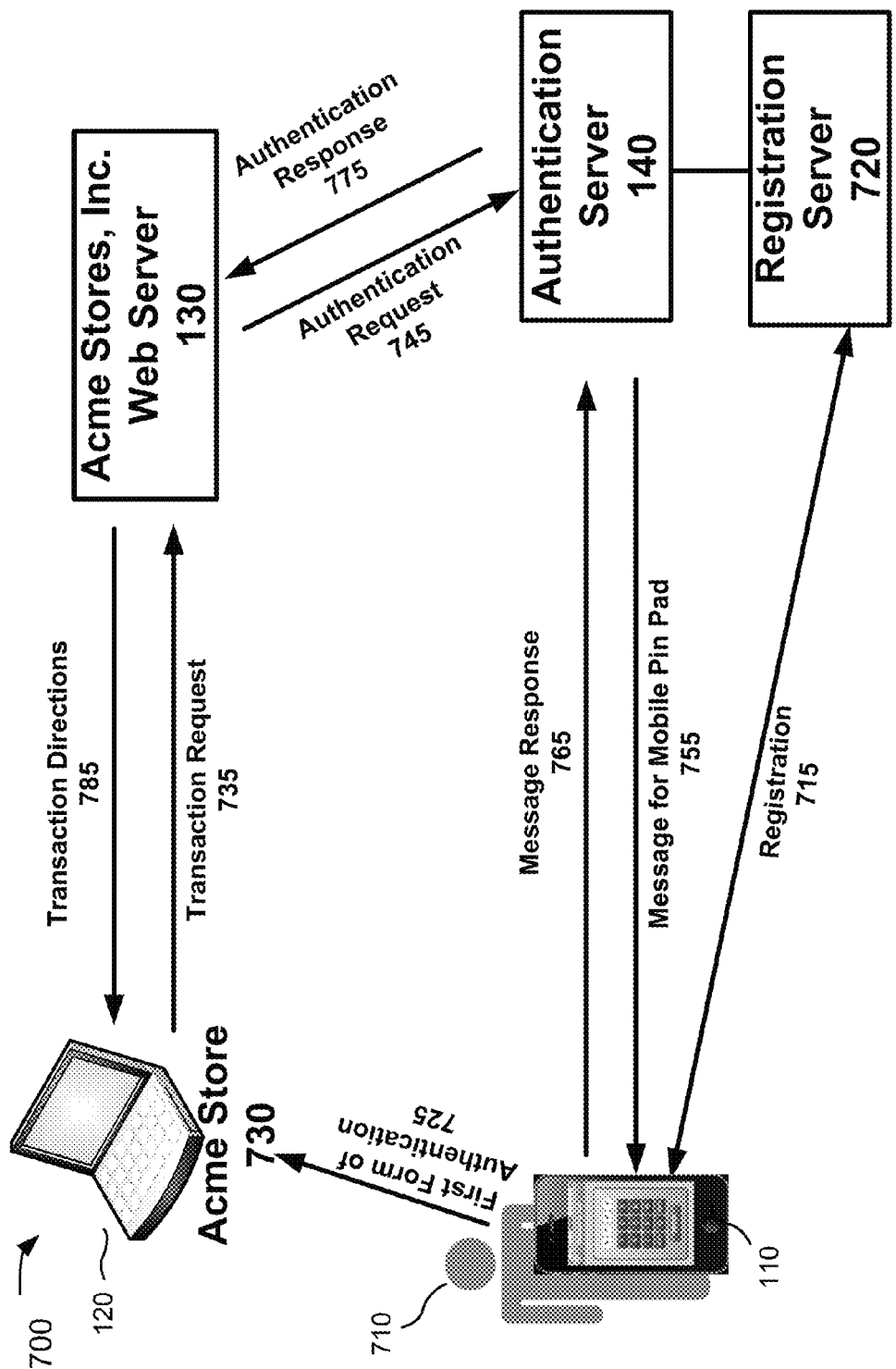
FIG. 7 is a diagram that illustrates an example of providing mobile pin pad authentication.

FIG. 7 is a diagram that illustrates an example 700 of providing mobile pin pad authentication for a user 710. User 710 may use mobile device 110. Assume that user 710 decides to register for a universal identity service (UIS) in order to use a digital wallet. The universal identity service may include authentication server 140 and a registration server 720. User 710 may use mobile device 110 to log into a UIS registration website, provided by registration server 720, to register for the UIS. Mobile device 110 and registration server 720 may exchange registration information 715 to complete a registration process. For example, user 710 may enter user identity information (including, for example, one or more of the following: a username, a first name and a last name (e.g., John Smith), a phone number of mobile device 110 (e.g., 202-555-5555), etc.) into a user interface of the UIS registration website by using mobile device 110. Mobile device 110 may transmit the identity information to registration server 720. Registration server 720 may access storage device(s) related to the UIS and/or outside sources (e.g., Equifax, LexisNexis, etc.) to determine additional user information (e.g., a current address, a date of birth, a city of birth, account information related to mobile device 110, credit card information, social security number, etc.) for user 710. Registration server 720 may generate challenge question(s) based on the additional user (e.g., what is your street address, what is your date of birth, etc.) information and transmit the challenge question(s) to mobile device 110. User 710 may complete the challenge question(s) by entering answers to the questions (e.g., 1600 Pennsylvania Ave., Jul. 4, 2010, etc.) by using mobile device 110. Mobile device 110 may transmit the answers to registration server 720. Registration server 720 may determine whether user 710 answered the questions of the challenge question(s) correctly. Registration server 720 may continue to retrieve new user information from outside sources and/or generate new challenge question(s) until registration server 720 determines that the identity of user 710 has been sufficiently validated.

When registration server 720 determines that the identity of user 710 has been sufficiently validated, registration server 720 may provide user 710 with an option of using mobile device 110 for mobile pin pad authentication. User 710 may accept the option. In response, registration server 720 may transmit a mobile pin pad application to mobile device 110 to handle the mobile pin pad authentication. Mobile device 110 and registration server 720 may also exchange additional information about mobile device 110 and a seed value (e.g., a random number) that mobile device 110 and authentication server 140 will need to generate equivalent OTPs during mobile pin pad authentication. The mobile pin pad application may also request user 710 to enter a PIN (e.g., 3 2 1 4) that will be used for the mobile pin pad authentication for user 710. Registration server 720 may also provide user 710 with options to use the mobile pin pad authentication for different types of transactions (e.g, access website(s), online financial transactions, provide verification regarding geographic location of user 710, provide electronic/digital signatures, online gaming transactions, etc.).

Assume that user 710 decides to use the mobile pin pad authentication for transactions involving a digital wallet. Registration server 720 may request account information (e.g., credit card account information, checking account information, etc.) from user 710 to set up the digital wallet. Registration server 720 may also request user 710 to indicate one or more first forms of authentication (e.g., a username and a password, a reward card for a store, etc.) that user 710 may use to initiate a transaction with the digital wallet. In response, user 710 may enter their own account information (e.g., Visa; Credit Card No.: 1234 5678 9000 1000, Expiration Date: 07/2014; Security Code: 001) and the one or more first forms of authentication (e.g., reward card for Acme Stores; username: jsmith and password: ishop411; etc.) by using mobile device 110. Mobile device 110 may transmit the account information and the one or more first forms of authentication to registration server 720. Registration server 720 may communicate with one or more financial institutions (e.g., Bank of America) to complete the set-up of the digital wallet for user 710.

Assume that user 710 decides to purchase a computer from an Acme store 730. User 710 may proceed to Acme store 730 and select the computer for purchase. An employee of Acme store 730 may operate computer terminal 120. User 710 may approach the employee to complete a transaction of purchasing the computer using their digital wallet. User 710 may present a first form of authentication (e.g., reward card) to the employee to use the digital wallet. The employee may enter information about the transaction and the first form of authentication using computer terminal 120. In another implementation, user 710 may enter information about the transaction (e.g., manually enter an identifier corresponding to the transaction, scan bar code corresponding to the computer, etc.) and the first form of authentication (e.g., manually enter an identifier corresponding to the first form of authentication, scan the reward card, etc.) by using computer terminal 120 and/or a user terminal connected to computer terminal 120.

Computer terminal 120 may generate a transaction request 735 based on the transaction (e.g., a purchase of the computer using user 710's digital wallet), the first form of authentication (e.g., information corresponding to the reward card or the username and the password of user 710), and a geographic location (e.g., a geographic location identifier (e.g., L215), a geographic name of an area (e.g., San Antonio, Tex.), geographic location coordinates (latitude and longitude)) of Acme store 730 in order to process the transaction. Computer terminal 120 may transmit transaction request 735 to an Acme Stores, Inc. web server 130 (herein, web server 130). Web server 130 may process all transactions initiated at Acme store 730 and other Acme stores at different locations. Web server 130 may determine that a second form of authentication via mobile pin pad authentication is necessary to process the transaction specified in transaction request 735. Accordingly, web server 130 may generate an authentication request 745 and transmit authentication request 745 to authentication server 140. Authentication request 745 may include a unique transaction ID (e.g., AS13456) assigned for the transaction by a relying application of web server 130, transaction information to describe the transaction (e.g., request to authorize payment to purchase a computer from Acme Store), and user identity information about user 710 (e.g., name of user 710, the first form of identity information), etc.

Authentication server 140 may retrieve a phone number (e.g., 202-555-5555) of mobile device 110 based on the user identity information included in authentication request 745. Authentication server 140 may generate a message for mobile pin pad 755 to prompt the mobile pin pad application of mobile device 110 to conduct mobile pin pad authentication. Message for mobile pin pad 755 may include a request (e.g., "Would you like to use mobile pin pad authentication to authorize a purchase of a computer from Acme Store using your digital wallet? (Enter Y/N)") based on the transaction information included in authentication request 745. Message for mobile pin pad 755 may also specify other information that needs to be received from mobile device 110 (e.g., geographic location coordinates of mobile device 110) in addition to an OTP for the second form of authentication. Authentication server 140 may transmit message for mobile pin pad 755 to mobile device 110 based on the phone number retrieved for mobile device 110.

Mobile device 110 may receive message for mobile pin pad 755. The mobile pin pad application of mobile device 110 may receive message for mobile pin pad 755, display the request included in message for mobile pin pad 755 on a display of mobile device 110, and notify (e.g., via a ring, vibration, etc.) user 710 that the request is displayed. User 710 may view the request and enter "Y" or "N," by using mobile device 110, in response to the request. Assuming that user 710 wants to proceed with the transaction, mobile device 110 may receive an entry of "Y" entered by user 710. In response, mobile device 110 may display a mobile pin pad on the display of mobile device 110. User 710 may enter the PIN (e.g., 3 2 1 4) that the user selected for mobile pin pad authentication.

Mobile device 110 may determine that user 710 entered the correct PIN. Thereafter, mobile device 110 may generate an OTP based on the seed value that was provided by registration server 720 as part of registration information 715 during the registration process. Mobile device 110 may generate a message response 765. Message response 765 may include the OTP, the geographic location coordinates of mobile device 110, and any other information requested in the message for mobile pin pad 755. Mobile device 110 may transmit message response 765 to authentication server 140.

In response to receiving message response 765, authentication server 140 may generate a comparison OTP based on the same seed value that was provided to mobile device 110 during the registration process from registration server 720. Authentication server 140 may determine whether the OTP of message response 765 matches the comparison OTP. If there is a match, authentication server 140 may determine that the second form of authentication was successful via mobile pin pad authentication and approve the transaction.

Furthermore, after approving the transaction, authentication server 140 may proceed to calculate a risk score for the transaction. The risk score may be calculated based on a variety of factors, including a relationship between the geographic location coordinates of computer terminal 120/Acme store 730 and the geographic location coordinates of mobile device 110, previous transactions conducted by user 710 using mobile pin pad authentication, previous transactions conducted by user 710 using the digital wallet of user 710, etc. Authentication server 140 may generate an authentication response 775. Authentication response 775 may include the unique transaction ID (e.g., AS13456) that was included in authentication request 745, a success indicator (e.g., "Success," "Transaction Approved," etc.) to indicate that the second form of authentication for the purchase of the computer was successfully received, the risk score, and/or the geographic location coordinates of mobile device 110.

Authentication server 140 may transmit authentication response 775 to web server 130. Web server 130 may determine whether to instruct the employee operating computer terminal 120 at Acme store 730 to complete the transaction (i.e., allow user 710 to buy the computer using user 710's digital wallet). Web server 130 may make the determination based on the authentication response 775. For example, web server 130 may determine that the transaction should be completed when that the second form of authentication for the transaction was successfully received, when the risk score is above a predefined threshold, and/or when the geographic location coordinates of mobile device 110 coincide with the geographic location coordinates of computer terminal 120. Web server 130 may generate transaction directions 785 to indicate to the employee operating computer terminal 120 at Acme store 730 whether to complete the transaction. In this example, computer terminal 120 may receive transaction directions 785 and display a message to the employee to inform the employee that the purchase of the computer by user 710 using user 710's digital wallet is approved. As a result, the employee may perform additional steps (e.g., charge the digital wallet of user 710, complete check-out, pack computer, print receipt, etc.) necessary to provide the computer to user 710 to complete the transaction. In an alternative implementation, the digital wallet of user 710 may be charged by web server 130 and/or authentication server 140 after the second form of authentication is deemed successfully received/the mobile pin pad authentication is deemed successful (i.e., when the OTP included in message response 765 is determined to match the comparison OTP generated by authentication server 140).

In yet another implementation, message response 765 may include the PIN input entered by user 710. Authentication server 140 may determine whether the PIN input, included in message response 765, is correct (i.e., matches a PIN selected by user 710 during the registration process). Authentication server 140 may generate an OTP after determining that the input PIN is correct. Authentication server 140 may transmit the OTP in authentication response 775 to web server 130. Authentication server 140 and/or web server 130 may determine whether to approve the transaction based on the OTP.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4-6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    generating, by a server device, a message based on an authentication request for a transaction, wherein the authentication request comprises first location information;
    transmitting, by the server device, the message to a remote device based on the authentication request, wherein the message prompts a pin pad application;
    receiving, by the server device, a message response from the remote device, wherein the message response comprises a first one time password (OTP) generated by the pin pad application of the remote device, and second location information;
    validating, by the server device, the first OTP;
    generating, by the server device, a success authentication response when the validating of the first OTP is successful, where the success authentication response comprises an approval of the transaction;
    calculating, by the server device, a risk score for the transaction based on the first and second location information; and
    transmitting, by the server device, the success authentication response and the risk score.

2. The method of claim 1, further comprising:
    transmitting the pin pad application to the remote device, where the pin pad application displays a pin pad and generates the first OTP when the pin pad is used to enter a correct personal identification number (PIN);
    receiving the authentication request for the transaction from a web server;
    determining an identity of a user of the remote device based on the authentication request; and
    determining contact information of the remote device based on the identity of the user,
    where the transmitting the message to the remote device based on the authentication request comprises transmitting the message to the remote device based on the contact information.

3. The method of claim 2,
    where the contact information is a phone number, and
    where the remote device is a mobile device.

4. The method of claim 1, where the validating of the first OTP comprises:
    generating a second OTP; and
    determining whether the first OTP matches the second OTP, where the validating of the first OTP is successful when the first OTP matches the second OTP.

5. The method of claim 1,
    wherein the first location information of the authentication request comprises a location of the transaction; and
    wherein the second location information of the message response comprises a location of the remote device.

6. The method of claim 1, wherein the generating of the message by the server device further includes:
    specifying, by the server device, one or more criterion that determines whether the remote device is to automatically generate the OTP in response to the transmitted message, wherein the one or more criterion includes at least one of:
        a predetermined period of time for providing a personal information number (PIN), or
        a predetermined distance for the remote device in response to a determined location information.

7. The method of claim 1, where the transaction is one of logging into a website by a user of the remote device, purchasing an item by the user, or providing verification of identity by the user.

8. A system comprising:
    a memory to store user information for a user of a mobile device; and
    a processor, connected to the memory, to:
        receive an authentication request for a transaction from a web server, wherein the authentication request comprises a request for at least one geographical coordinate of the mobile device,
        identify a phone number of the mobile device based on identifying information of the user in the authentication request and the user information,
        transmit a message to the mobile device based on the phone number, wherein the message prompts a mobile pin pad application of the mobile device, receive a message response from the mobile device, wherein the message response comprises at least another geographical coordinate, determine whether the mobile device provided a mobile pin pad authentication for the user based on the message response, and transmit a success authentication response to the web server when the mobile device provided the mobile pin pad authentication for the user, wherein the success authentication response includes the at least one other geographical coordinate.

9. The system of claim 8, where the message response comprises a first one time password (OTP) generated by the mobile device.

10. The system of claim 9, where, when determining whether the mobile device provided the mobile pin pad authentication for the user, the processor is further to:

generate a second OTP; and determine whether the first OTP matches the second OTP.

11. The system of claim 8, wherein the mobile device automatically generates a personal identification number (PIN) for the pin pad authentication based on predetermined conditions, and wherein the authentication request comprises the request for the at least one geographical coordinate of the mobile device.

12. The method of claim 11, wherein the predetermined conditions comprises:

a PIN being provided within a predetermined period of time, or the mobile device being within a predetermined distance of a location.

13. The method of claim 8, wherein the at least one geographical coordinate of the authentication request comprises a first location of the transaction, wherein the at least other geographical coordinate of the message response comprises a second location of the mobile device, wherein the processor is further to generate a risk score for the transaction based on the first location and the second location, and wherein the success authentication response comprises the risk score.

14. The method of claim 8, where the transaction requires a first form of authentication and a second form of authentication, where the second form of authentication is provided by the success authentication response.

15. A non-transitory computer-readable media storing a program for causing a computer to perform a method, the method comprising:

receiving a message from an authentication server;

determining whether the received message includes a request for location information;

displaying a request based on the message;

receiving a response to the request from a user;

transmitting location information that comprises first location information and second location information in response to determining that the received message includes a request for location information;

displaying a mobile pin pad when the response indicates that the user wants to proceed with providing mobile pin pad authentication for a transaction;

receiving a personal identification number (PIN) input through the mobile pin pad;

calculating a risk score for the transaction based on the first and second location information;

generating a message response based on the pin input, wherein the calculated risk score is included in the message response; and transmitting the message response and the location information to the authentication server.

16. The non-transitory computer-readable media of claim 15, wherein the method further comprises:

determining whether the PIN input is equal to a personal identification number (PIN) stored for the user; and generating a first one time password (OTP) when the PIN input is equal to the PIN.

17. The non-transitory computer-readable media of claim 16, wherein the generating the OTP comprises generating the OTP based on a seed value provided by the authentication server.

18. The non-transitory computer-readable media of claim 16, wherein the generating the message response comprises including the OTP in the message response when the PIN input is equal to the PIN.

19. The non-transitory computer-readable media of claim 15, further comprising:

determining whether to automatically generate the PIN for the pin pad authentication based on predetermined conditions.

20. The non-transitory computer-readable media of claim 15, wherein the message comprises a text of the request, and wherein the request describes the transaction.

* * * * *